UNITED STATES PATENT OFFICE.

HANS SCHWARZBERG AND EMANUEL NOA, OF BERLIN, GERMANY.

PROCESS FOR PRODUCING A HORN-LIKE MASS.

No. 864,388.   Specification of Letters Patent.   Patented Aug. 27, 1907.

Application filed November 26, 1906. Serial No. 345,220.

*To all whom it may concern:*

Be it known that we, HANS SCHWARZBERG and EMANUEL NOA, both subjects of the King of Prussia, and residents of Berlin, Kingdom of Prussia, German Empire, (whose post-office addresses are respectively Berlin, Landsbergerstrasse 91, and Berlin, Dresdnerstrasse 38,) have invented a Process for Producing a Horn-Like Mass, of which the following is a full, clear, and exact description.

Our invention relates to a process for producing a hornlike mass, which may be easily formed with or without pressure. Its great plasticity, pliability and flexibility distinguishes our mass favorably from other well known similar substances.

Our mass is obtained by mixing corresponding quantities of casein, starch, gelatin, glycerin, paraffin and the sulfonic acid of $\alpha$-naphthol, to which suitable filling materials may be added.

We dissolve the casein in an aqueous solution of borax till it forms a paste and then a paste made of starch and water is added. To this paste melted paraffin and gelatin is added, the latter being first advantageously mixed with one per cent. of its weight of glycerin. The whole mixture is then thoroughly stirred till it forms a uniform mass. Finally a corresponding quantity of $\alpha$-naphtholsulfonic acid and if necessary filling material is added, after which the whole mass is rolled into plates for the purpose of removing most of the water. If necessary the plates can be altogether desiccated by immersing them in alcohol. This desiccated mass is then treated with acetate of alumina for the purpose of rendering it hard. The influence of the acetate of alumina rendering the material sometimes brittle and thereby difficult to work we may sometimes prefer to harden the finished article by exposing it to vapors generated from a solution of acetate of alumina, to which a certain quantity of hexamethylenetetramin is added.

These vapors contain formaldehyde ammonia, which causes a hardening of the whole mass to a comparatively great depth and yet leave it sufficiently elastic for all practical purposes.

If thick pieces or plates of our mass are to be produced the best method is to roll it first into plates as thin as possible. The necessary number of these plates are then rolled together by employing an extremely high pressure. In this manner plates of different colors may be rolled together, by which peculiar designs may be obtained.

The following proportions of the substances employed for producing our mass may be mentioned as an example: 50 parts of common, pure, air-dry casein, 50 parts of starch, 25 parts of gelatin, 0.25 parts of glycerin, 7—10 parts of paraffin and 15 to 20% of $\alpha$-naphtholsulfonic acid, the percentage of the last named substance referring to the whole of the substances mentioned before.

It should be understood that by naphtholsulfonic acid is meant $\alpha$-naphtholmonosulfonic acid or any other sulfonic acid of naphthol which will have the same effect.

What we claim as our invention and desire to secure by Letters Patent is:

1. A hornlike mass, consisting of a uniform mixture of casein, starch, gelatin, glycerin, paraffin and $\alpha$-naphtholsulfonic acid, substantially as described.

2. A process for producing a hornlike mass by mixing thoroughly, casein, starch, gelatin, glycerin, paraffin and $\alpha$-naphtholsulfonic acid in suitable proportions and then rolling the whole mass, substantially as described.

3. A process for producing a hornlike mass by mixing thoroughly casein, starch, gelatin, glycerin, paraffin and $\alpha$-naphtholsulfonic acid in suitable proportions, then rolling the whole mass and finally hardening it by the influence of vapors generated from a solution of acetate of alumina and hexamethylenetetramin, substantially as described.

HANS SCHWARZBERG.
EMANUEL NOA.

Witnesses:
WOLDEMAR HAUPT,
HENRY HASPER.